(12) United States Patent
Totten et al.

(10) Patent No.: US 9,785,320 B2
(45) Date of Patent: Oct. 10, 2017

(54) SERVICE GALLERY USER INTERFACE PRESENTATION

(71) Applicant: Microsoft Technology Licensing, LLC, Redmond, WA (US)

(72) Inventors: Nathan J. Totten, Bellevue, WA (US); Jesse David Francisco, Lake Stevens, WA (US); Alaa Shaker, Bellevue, WA (US); Guruprasad M. Airy, Redmond, WA (US); Vishal R. Joshi, Redmond, WA (US); Leon Ezequiel Welicki, Issaquah, WA (US); Jon Harris, Sammamish, WA (US); Jonah Bush Sterling, Seattle, WA (US); Sunay Vaishnav, Bellevue, WA (US); Jamey Baumgardt, Redmond, WA (US); Timothy Michael McBride, Snohomish, WA (US); Alvaro Rahul Dias, Bellevue, WA (US); William J. Staples, Duvall, WA (US); Karandeep Singh Anand, Kirkand, WA (US); Adam Mohamed Abdelhamed, Bellevue, WA (US); Stephen Michael Danton, Seattle, WA (US); Syed Nadir Ahmed, Redmond, WA (US); Brad Olenick, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 14/320,246

(22) Filed: Jun. 30, 2014

(65) Prior Publication Data

US 2015/0286370 A1    Oct. 8, 2015

Related U.S. Application Data

(60) Provisional application No. 61/974,324, filed on Apr. 2, 2014.

(51) Int. Cl.
*G06F 3/14* (2006.01)
*G06F 3/0484* (2013.01)
(Continued)

(52) U.S. Cl.
CPC ...... *G06F 3/04842* (2013.01); *G06F 3/04817* (2013.01); *G06F 3/04847* (2013.01); *G06F 17/3089* (2013.01)

(58) Field of Classification Search
CPC .................................. G06F 3/14; G06F 3/17
(Continued)

(56) References Cited

U.S. PATENT DOCUMENTS 7,433,835 B2   10/2008   Frederick et al.
7,571,123 B1   8/2009    Hill et al.
(Continued)

OTHER PUBLICATIONS

"International Search Report & Written Opinion Received for PCT Patent Application No. PCT/US2015/023449"Mailed Date: Jun. 19, 2015, 10 pages.
(Continued)

*Primary Examiner* — Ruay Ho
(74) *Attorney, Agent, or Firm* — Workman Nydegger

(57) ABSTRACT

A gallery user interface element that includes multiple selectable service user interface elements. Each of the selectable service user interface elements, when selected, initiates a corresponding predetermined action. Thus, the gallery may be used to initiate any number of predetermined actions by selecting appropriate service user interface elements. The predetermined actions may be performed by a number of user interface elements that are collectively offered by a variety of different applications, application extensions, or the system itself. The predetermined actions may include at least one predetermined action that extends an extendible canvas with one or more additional user interface elements.
(Continued)

The gallery may include multiple pinnable elements and have different versions depending on a context in which the gallery was opened.

18 Claims, 14 Drawing Sheets

(51) Int. Cl.
    *G06F 3/0481*     (2013.01)
    *G06F 17/30*     (2006.01)

(58) Field of Classification Search
    USPC .................. 715/751; 705/7.31, 14.23; 714/2
    See application file for complete search history.

(56) References Cited

U.S. PATENT DOCUMENTS

| | | |
|---|---|---|
| 8,346,520 B2 | 1/2013 | Lu et al. |
| 2009/0112735 A1 | 4/2009 | Viehmann et al. |
| 2010/0070794 A1* | 3/2010 | Park ................... G06F 11/0733 714/2 |
| 2010/0198673 A1* | 8/2010 | Quinlan ................. G06Q 30/02 705/14.23 |
| 2013/0085899 A1 | 4/2013 | Tyra et al. |
| 2013/0311644 A1 | 11/2013 | Herger et al. |
| 2014/0013308 A1 | 1/2014 | Gounares et al. |
| 2014/0351015 A1* | 11/2014 | Ehn ........................ G06Q 30/02 705/7.31 |

OTHER PUBLICATIONS

"TIBCO Designer™ User's Guide Software Release 5.8.0", Published on: Nov. 1, 2012, Available at: https://docs.tibco.com/pub/designer/5.8.0_november_2012/pdf/tib_Designer_usr.pdf.

"BEA WebLogic Platform™ Introducing BEA Weblogic Platform Restricted Rights Legend", Published on: Mar. 1, 2005, Available at: http://docs.oracle.com/cd/E13196_01/platform/docs70/pdf/intro.pdf.

"BEA WebLogic Workshop™ 8.1 (beta) JumpStart Guide", Published on: Mar. 1, 2003, Available at: http://www.javable.com/tutorials/bea/BEA_WebLogicWorkshop81_JumpStartGuide.pdf.

Legner, Christine, "Is there a Market for Web Services?—An Analysis of Web Services Directories", In Proceedings of the 1st International Workshop on Web APIs and Services Mashups, Sep. 17, 2007, 17 pages.

"International Preliminary Report on Patentability Issued in PCT Application No. PCT/US2015/023449", Mailed Date: Jun. 13, 2016, 8 Pages.

"Second Written Opinion Issued in PCT Application No. PCT/US2015/023449", Mailed Date: Feb. 11, 2016, 7 Pages.

* cited by examiner

Figure 3

SERVICE GALLERY USER INTERFACE PRESENTATION

CROSS REFERENCE TO RELATED APPLICATIONS

This application claims the benefit of U.S. Provisional Application Ser. No. 61/974,324, filed Apr. 2, 2014, which provisional patent application is incorporated herein by reference in its entirety.

BACKGROUND

Computing systems often display a gallery, which is a collection of available items and/or services. For instance, some web sites (such as e-commerce sites) allow for items or services for purchase, and that are related by the search terms.

In the case of web site search results, once the user selects one of the resulting web sites, the browser navigates to the selected web site. The user experience then is governed exclusively by the provider of the web site. In the case of search results from within a web site itself, the user might select one of those search results, but is then either redirected to another web site, or is brought to a page that is also governed by the web site. Accordingly, in conventional galleries, the user often either exits the control of the provider of the gallery (in which case the user experience may vary dramatically), or the user stays within the same environment provided by the gallery, and thus engages with components provided by the same provider as the gallery.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a gallery user interface element that includes multiple selectable service user interface elements. Each of the selectable service user interface elements, when selected, initiates a corresponding predetermined action. In some embodiment, the user interface elements may be contributed by different parties, such as by different applications or application extensions running in different servers authored by different teams. Thus, the gallery may be used to initiate any number of predetermined actions by selecting appropriate service user interface elements.

In accordance with various embodiments of a first aspect described herein, the predetermined actions may be performed by a number of user interface elements that are collectively offered by a variety of different applications, application extensions, or the system itself. Alternatively or in addition, the predetermined actions include at least one predetermined action that extends an extendible canvas with one or more additional user interface elements. Alternatively or in addition, some, most or all of the predetermined actions involve the creation of a corresponding set of one or more user interface elements that provide a corresponding user experience. The user experiences may have a common set of behavior regardless of which service user interface element was selected from the gallery.

In accordance with various embodiments of a second aspect described herein, the gallery user interface element includes multiple pinnable segments. Each pinnable segment includes a pin control that, when selected, pins the corresponding pinnable segment to a predetermined portion of the user interface. Such pinning allows convenient and direct access to segments.

In accordance with various embodiments of a third aspect described herein, the gallery has different versions in which the gallery is presented differently, depending on a context in which the user triggered the gallery to open. In a particular method, the system detects user input that triggers opening of the gallery, and determines a user interface context of the user input. The system then identifies which of multiple versions of the gallery to open based on the user interface context. The system then displays a gallery user interface element that has the identified version of the gallery.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a gallery user interface element that is similar to that of FIG. 2, except that the user has selected a service control to create a third pinnable segment (a service description) of the gallery user interface element;

DETAILED DESCRIPTION

Figure 1:
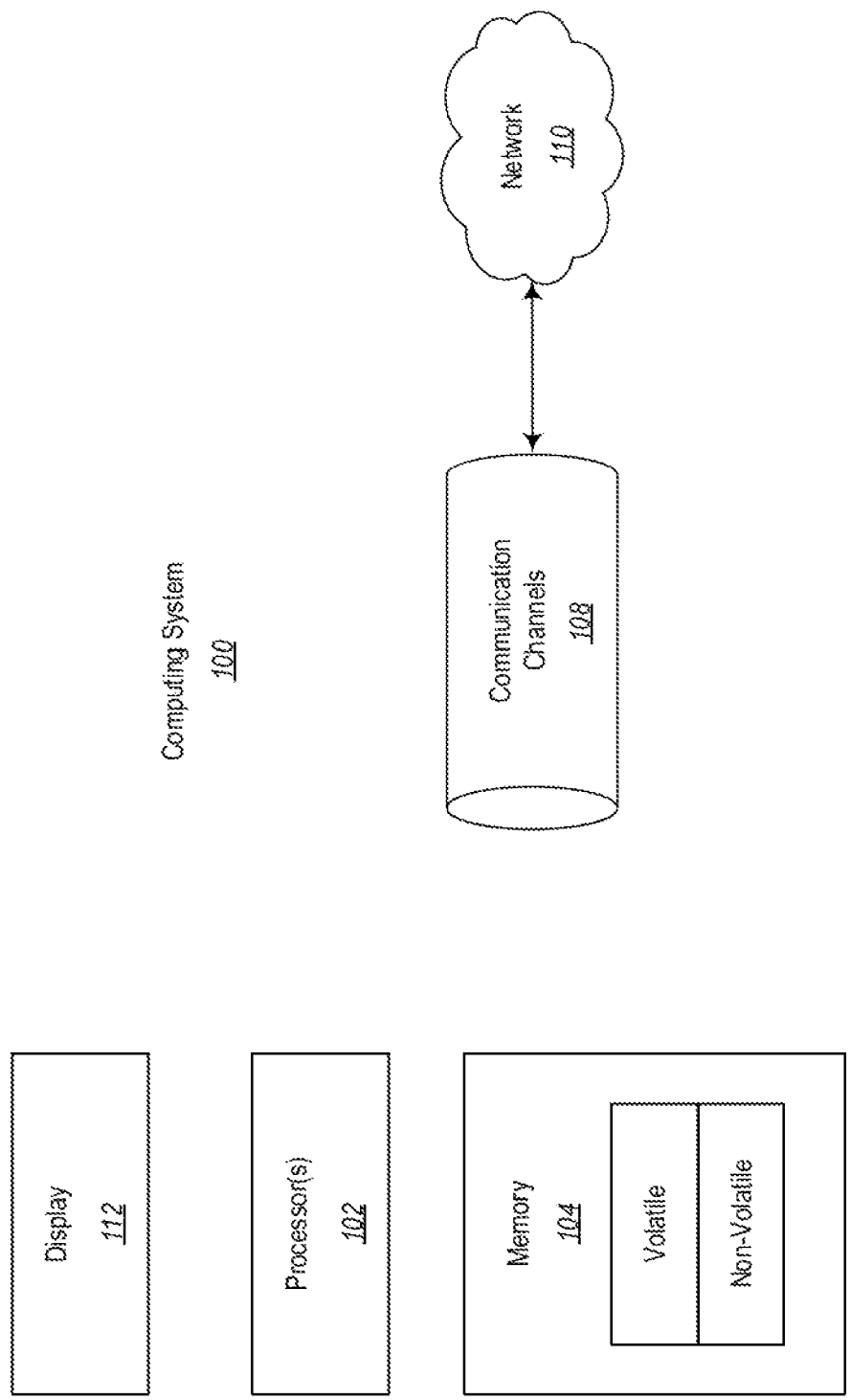
FIG. 1 illustrates an example computing system in which the principles described herein may be employed.

At least some embodiments described herein relate to a gallery user interface element that includes multiple selectable service user interface elements (also called herein "service controls"). Each of the selectable service user interface elements, when selected, initiates a corresponding predetermined action. In some embodiment, the user interface elements may be contributed by different parties, such as by different applications or application extensions running in different servers authored by different teams. Thus, the gallery may be used to initiate any number of predetermined actions by selecting appropriate service user interface elements.

In accordance with various embodiments of a first aspect described herein, the predetermined actions may be performed by a number of user interface elements that are collectively offered by a variety of different applications, application extensions, or the system itself. Alternatively or in addition, the predetermined actions include at least one predetermined action that extends an extendible canvas with one or more additional user interface elements. Alternatively or in addition, some, most or all of the predetermined actions involve the creation of a corresponding set of one or more user interface elements that provide a corresponding user experience. The user experiences may have a common set of behavior regardless of which service user interface element was selected from the gallery.

In accordance with various embodiments of a second aspect described herein, the gallery user interface element includes multiple pinnable segments. Each pinnable segment includes a pin control that, when selected, pins the corresponding pinnable segment to a predetermined portion of the user interface. Such pinning allows convenient and direct access to segment.

In accordance with various embodiments of a third aspect described herein, the gallery has different versions in which the gallery is presented differently, depending on a context in which the user triggered the gallery to open. In a particular method, the system detects user input that triggers opening of the gallery, and determines a user interface context of the user input. The system then identifies which of multiple versions of the gallery to open based on the user interface context. The system then displays a gallery user interface element that has the identified version of the gallery.

Some introductory discussion of a computing system will be described with respect to FIG. 1. Then, further embodiments will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 also includes a display 112 for displaying user interfaces such as those described herein.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
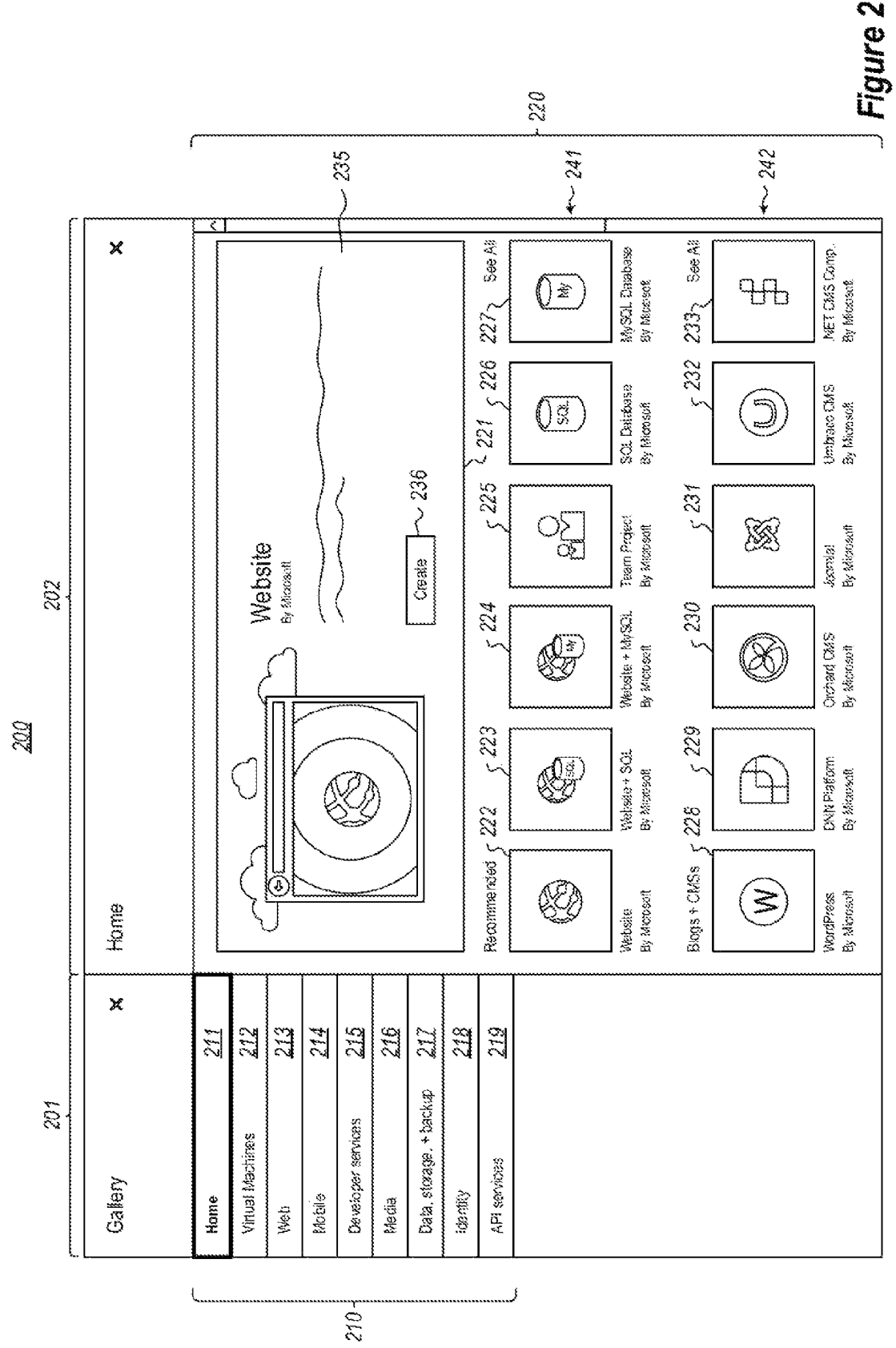
FIG. 2 illustrates a gallery user interface element which includes a category presentation segment and a selected category presentation segment that shows multiple selectable service controls.

FIG. 2 illustrates a gallery user interface element 200 which includes two pinnable segments 201 and 202. A category presentation segment 201 appears on the left, and a selected category presentation segment 202 appears to the right. In an example embodiment, the gallery user interface element 200 is displayed on an extendable canvas that extends in an extendible direction (e.g., rightward) when new user interface elements are added to the canvas. Thus, reviewing the canvas from left to right, the user may review a journey that the user has taken in order to arrive at the rightmost user interface element in the journey.

A category presentation segment 201 presents categories 210 of services and allows the user to select a category of services. For instance, the service categories 210 includes a home category 211; a virtual machines category 212; a web category 213; a mobile category 214; a developer services category 215, a media category 216; a data, storage and backup category 217, an identity category 218 and an API services category 219.

The selected category presentation segment 202 presents multiple service controls of the selected category of services. For instance, in FIG. 2, the user has selected the home category 211, which presents all of the service user interface elements from all categories. However, the user might have selected any of the other service categories 210 and the corresponding service user interface elements for that selected category would appear in the selected category presentation segment 202.

In this particular example, the selected category presentation presents service controls 220. Service controls 220 include thirteen illustrated service controls 221 through 233. However, the scroll bar 235 appears since there are more than thirteen total service controls in the home category 211. The user may select each of the service controls 220 to begin configuration of a corresponding service. More generally, each of the selectable service user interface elements 220 corresponds to a corresponding predetermined action that is performed in response to selection of the corresponding service user interface element. Thus, in the aggregate, a variety of predetermined actions may be engaged in by appropriate selection of the service control 220.

In some embodiments, each of the gallery segments 201 and 202 are pinnable. Accordingly, when segment 201 or 202 is pinned, an icon will appear in a predetermined portion of the user interface. Later, when that icon is selected, the segment 201 or 202, respectively, would appear. The segments 201 and 202 may each have a pin control for purposes of performing the pinning operation. The pin control may be displayed, or may be hidden and invoked through gestures.

The selected category presentation segment 202 presents different service controls in different ways. For instance, a high priority service control 221 is presented in large form, with the ability to directly begin configuring the service using the create control 236. Further recommended service controls 222 through 227 are illustrated in a prominent location in a recommended service controls area 241. Other service controls 228 through 233 are located further below in a less prominent location in another service controls area 242.

The service controls 221 through 233 may be provided by different entities, such as different applications or the system itself, different applications or by the main application that the extensions extend from, and so forth. Nevertheless, looking at FIG. 2, each of the service controls 221 through 233 appears consistent. They each have the same shape, each have an icon within that shape that represents the service, each has a title underneath the shape, and each has a publisher below the title. Furthermore, as will be described further below, each of the predetermined actions taken by the service controls 220 will result in a certain level of consistency in the user experience, regardless of the user experience being driven by different entities, such as different applications or the system itself, different applications or by the main application that the extensions extend from, and so forth.

Figure 3:
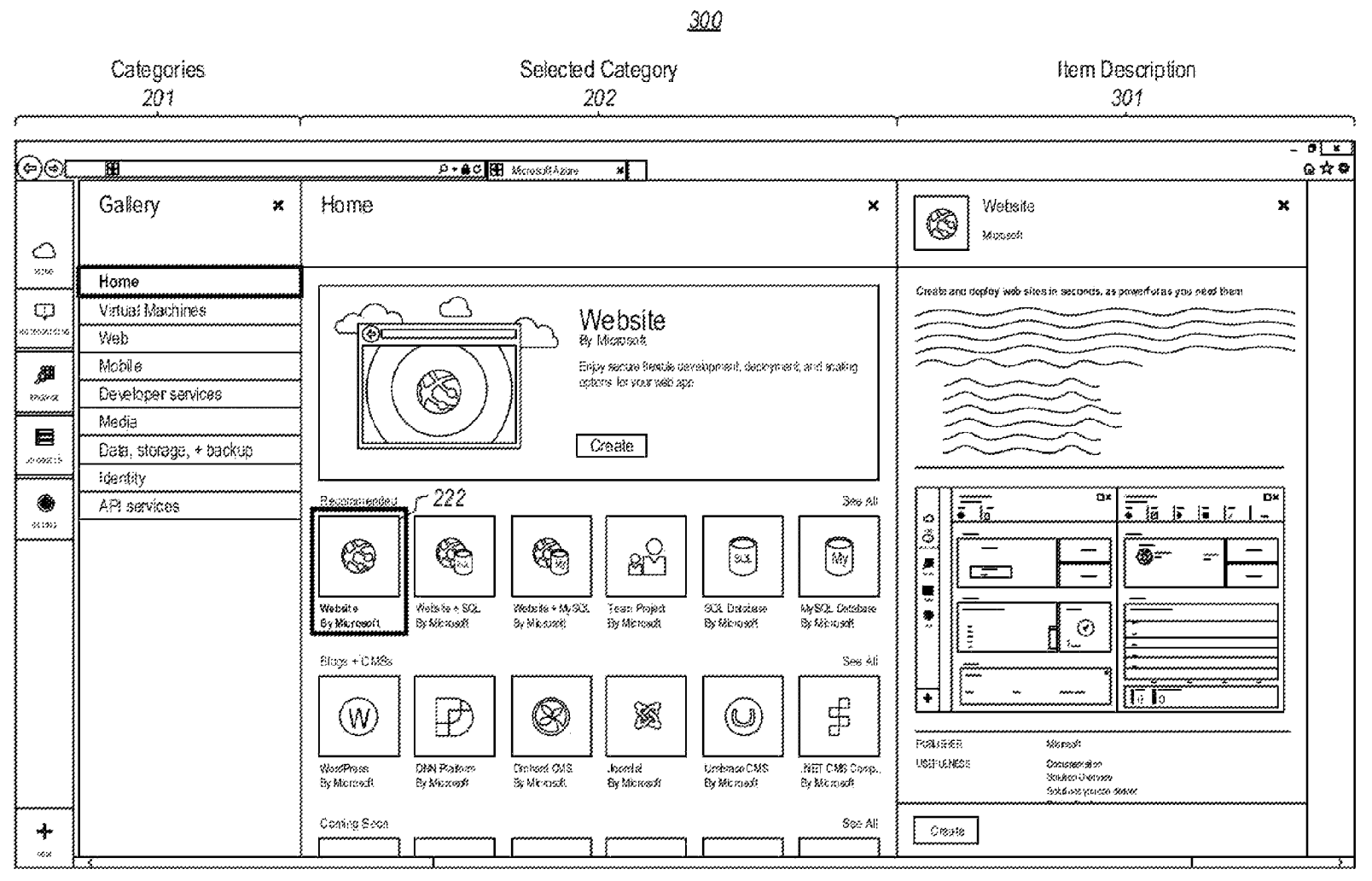

FIG. 3 illustrates a gallery user interface element 300 that is similar to the gallery user interface element 200 of FIG. 2, except that the user has selected the service control 222 to create a third pinnable segment of the gallery user interface element 300. In particular, the service description 301 describing a selected service appears when the user selects a corresponding service control. For instance, service description 301 is populated with information regarding the website service since the website control 222 is selected. Note that regardless of which entity provided the service control, the user experience will involve the appearance of an item description segment. Thus although the content of the item description will of course change depending on the service, the appearance of the item description provides user experience consistency regardless of which entity provided the service control and/or the underlying service. In accordance with some principles described herein, the data-driven aspect of this part of the experience as well—consistent experience is a big part of this solution.

Figure 4:
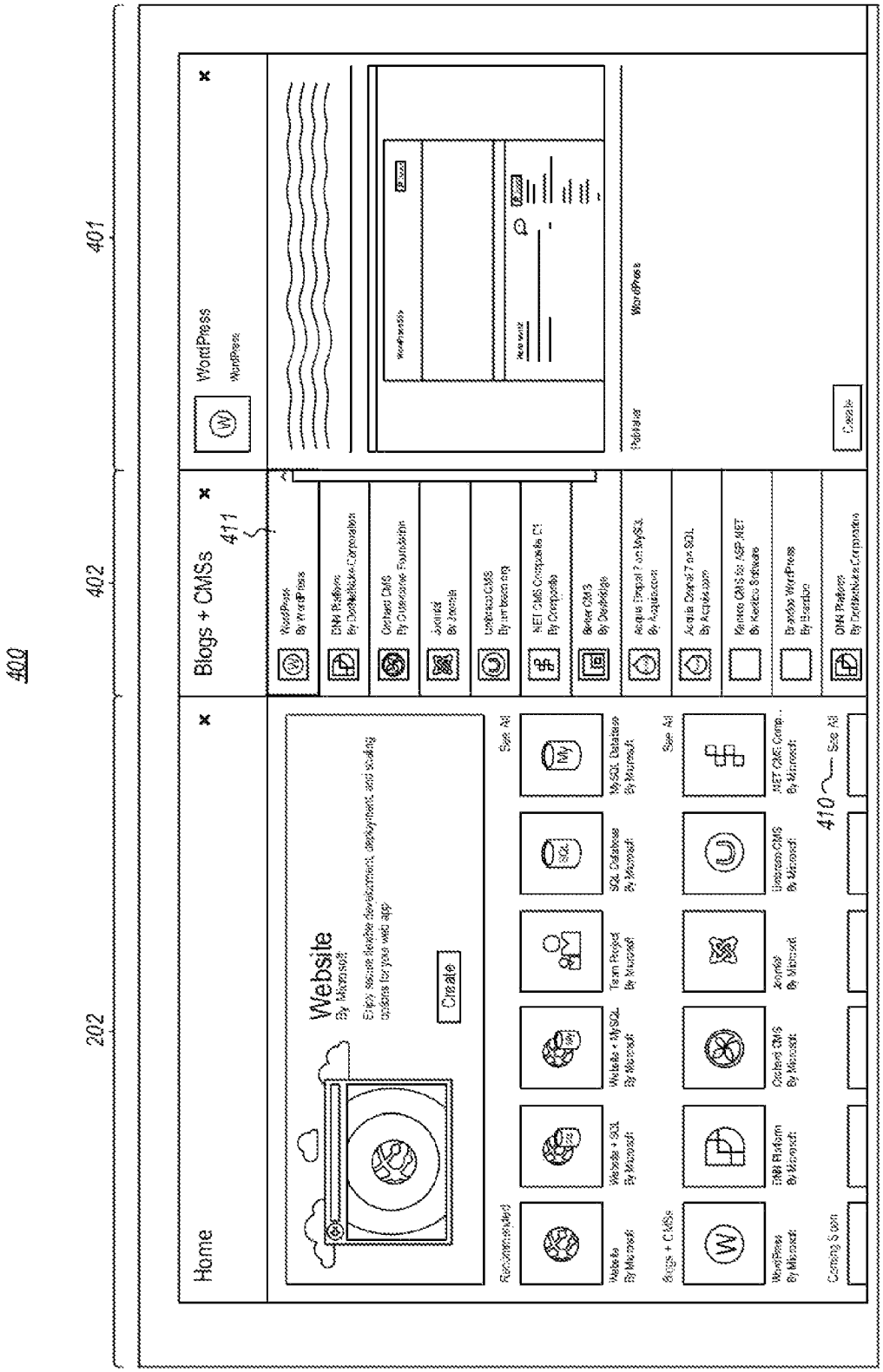
FIG. 4 illustrates a gallery user interface element that is similar to the gallery user interface element of FIG. 2, except that the "see all" control is selected to inject a listing of all service controls for the corresponding category.

FIG. 4 illustrates a gallery user interface element 400 that is similar to the gallery user interface element 300 of FIG. 2. However, there are a number of differences. First, the canvas is scrolled rightward such that the category presentation segment 201 is no longer in view. Furthermore, since there were more service controls in the selected category presentation segment 202 than was able to be displayed at one time, the user was provided with a control 410 that allowed a complete service presentation segment 402 between the category presentation segment 202 and the service description segment 401. Furthermore, the service description segment 401 is different in that it is now populated from a service control 411 selected within the complete service presentation segment 402.

Figure 5:
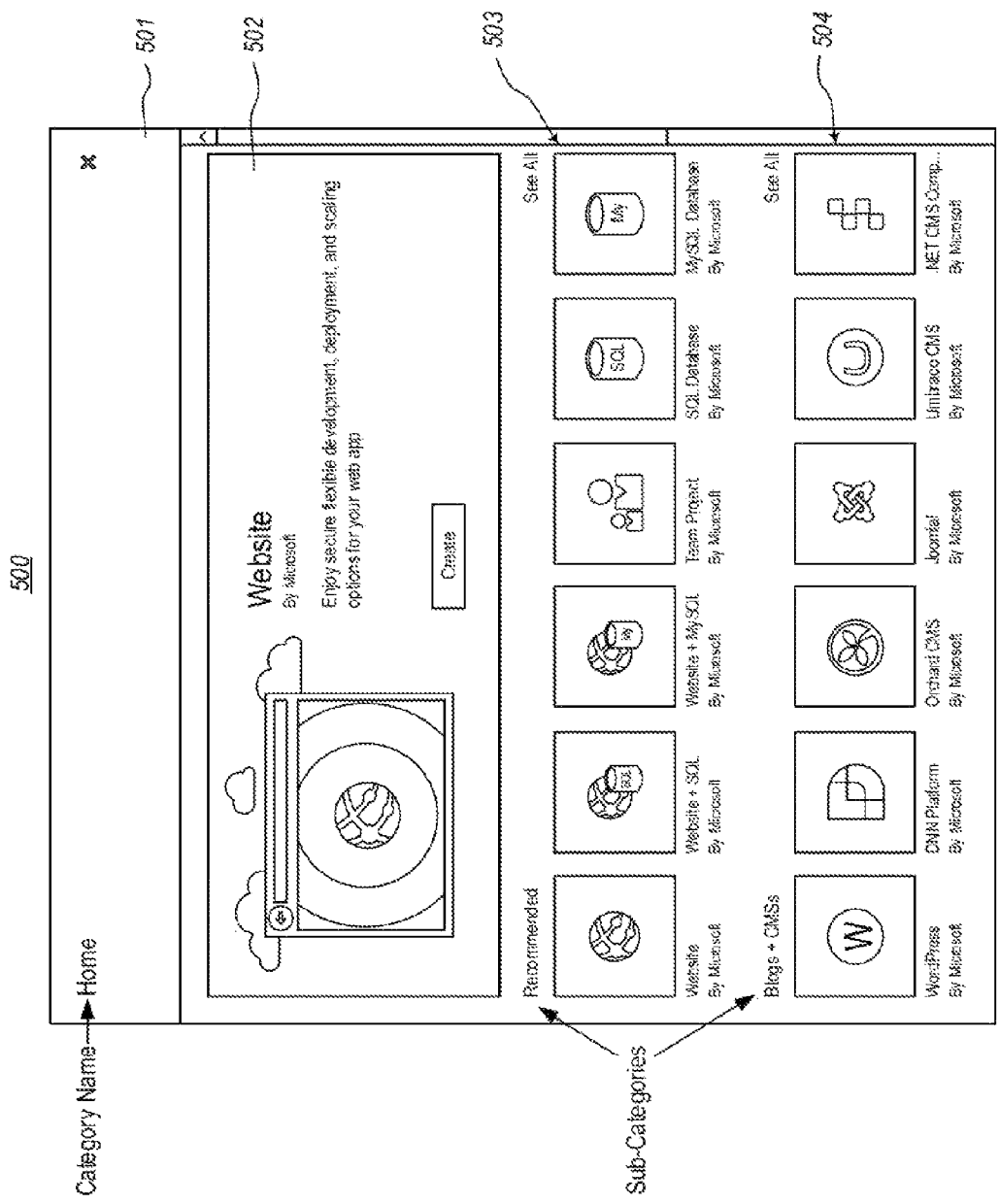
FIG. 5 illustrates a selected category segment with various components labelled.

FIG. 5 illustrates a selected category segment 500 that is similar to the selected category segment 202 of FIGS. 2, 3 and 4. However, various elements are labelled. Some or all of the various elements may similarly appear on other selected category segments regardless of the selected category thus again providing a consistent user experience. Here, a category name field 501 appears at the top of the selected category segment. A larger service control 502 is illustrated, which includes a high priority service that might commonly be desired by users in general or by this particular user. A recommend service control area 503 includes recommended service controls. An other service control area 504 includes other service controls.

Figure 6:
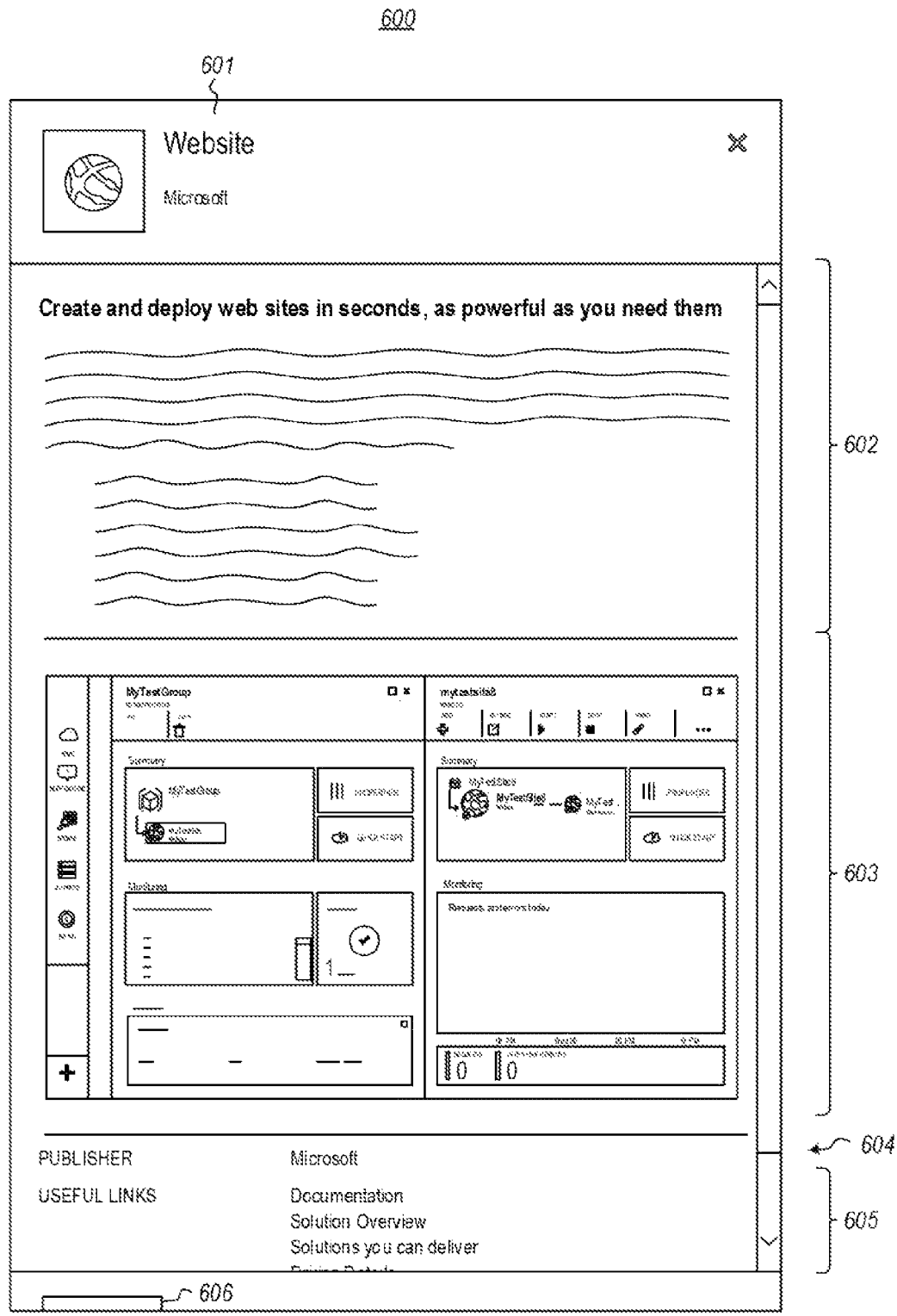
FIG. 6 illustrates a service description, which represents the service description of FIG. 3 in further detail.

FIG. 6 illustrates a service description 600, which simply represents the service description 301 of FIG. 3 in further detail. This service description may be fully data driven and displays details about the service (in this case, about a website creation service). As previously mentioned, the service description 600 can be pinned to a predetermined portion of the user interface. The service description 600 includes a service name 601, a description 602, a screenshot 603, a publisher 604, and useful links 605, which are data that may be supplied to create the service description 600 when the user makes a selection of a corresponding service control. A control 606 at the bottom (only part of which is shown in FIG. 6, but which would fully reveal upon scrolling slightly down) may be used to initiate configuration of the service. To provide consistency in the service description, the service description might be driven by each of the data types 601 through 605 (or a subset thereof), with positional dependency being consistently honored.

Figure 7:
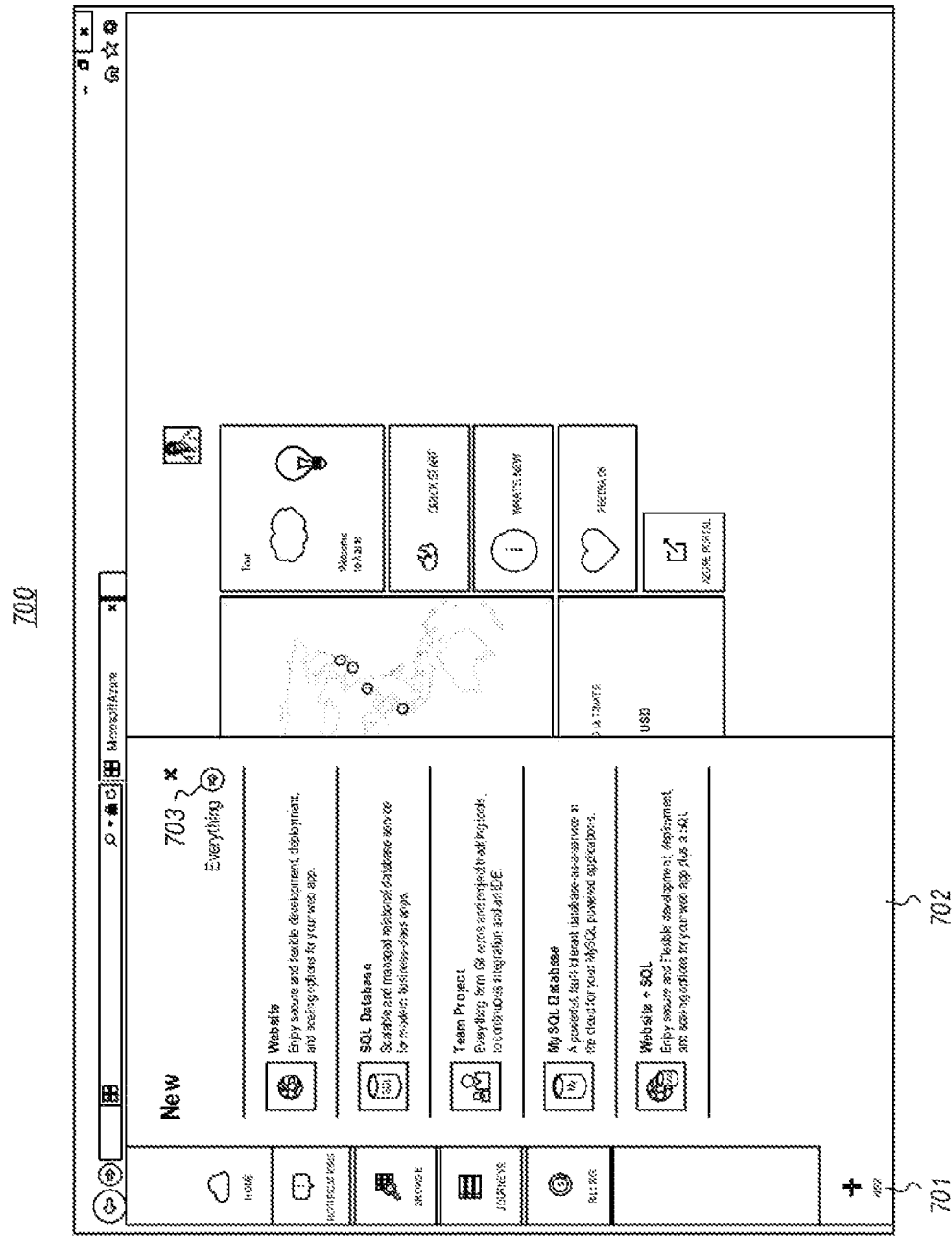
FIG. 7 illustrates a user interface that shows that the gallery may be opened in the context of an activity pane element that vertically spans the left side of the user interface.

FIG. 7 illustrates a user interface 700 that shows that the gallery may be opened in different contexts. For instance, in this context, the user opened the gallery from a user interface element that spans the left side of the user interface 700 (called a "jump bar" in some implementations). The user selected control 701. In response, the gallery user interface element 702 is caused to appear. Note that the gallery user interface element 702 appears different than the gallery user interface element 200, and is a curated subset of the gallery. The curation may be based on which elements were last used, recommended, or favorites. The appearance is different, and also the list of available service controls is significantly reduced. A control 703 (marked "Everything") is further provided to allow the user to reveal the full gallery user interface element 200 (or perhaps just the category presentation segment 201) if so desired.

Figure 8:
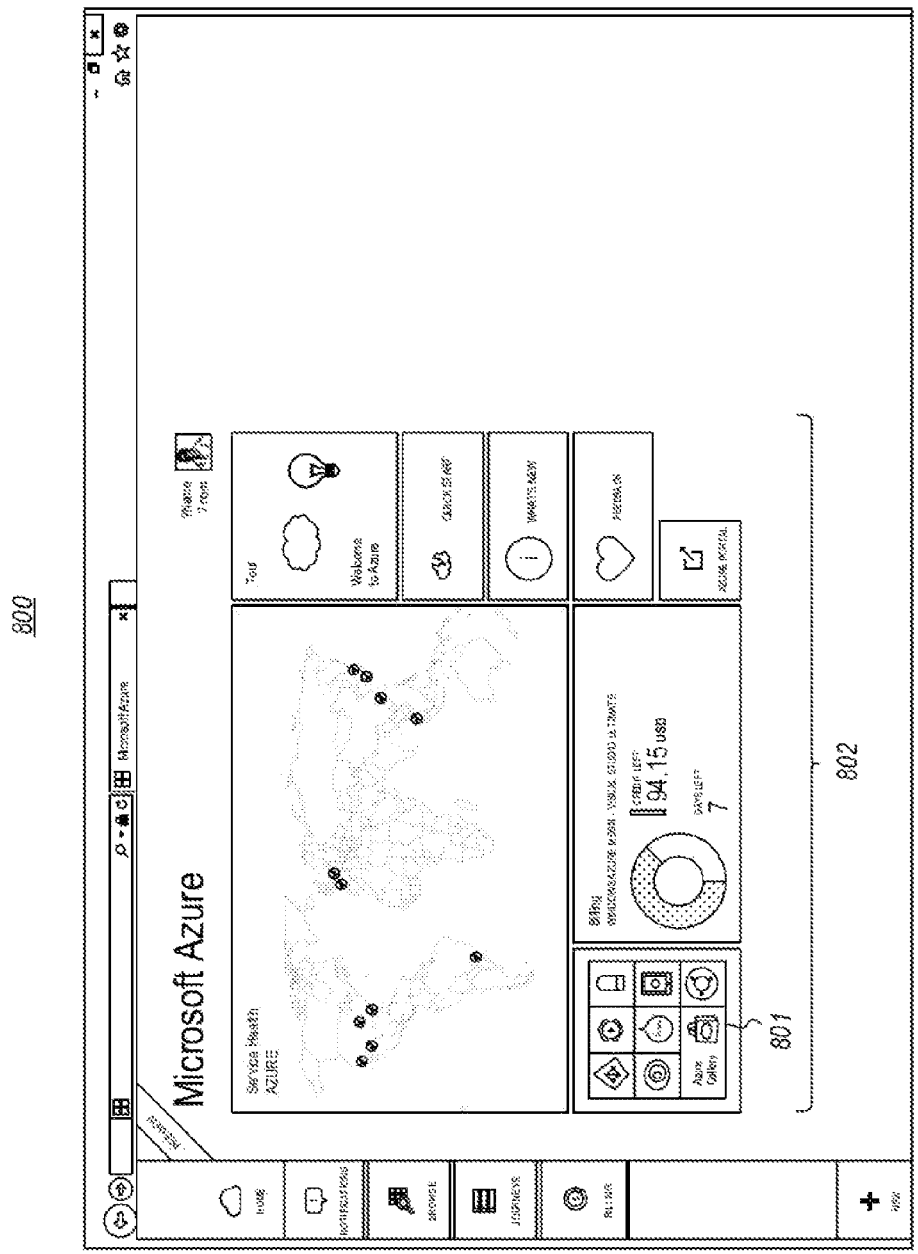
FIG. 8 illustrates a user interface that shows that the gallery may be opened in the context of a selectable element in a predetermined portion of the user interface into which items may be pinned.

FIG. 8 illustrates a user interface 800 that shows a gallery control 801. The selection of this gallery control 801 may cause the full gallery user interface element 200 (or perhaps just the category presentation segment 201) to appear. The gallery control 801 appears within an area 802 (called a "start board" in some embodiments) of the user interface 800. This area 802 may be the predetermined area previously mentioned where segments of the gallery user interface element may be pinned. In one embodiment, the gallery control 801 may be a permanent part of the area 802.

Note how different versions of the gallery appeared depending on the context. For instance, in FIG. 7, the gallery user interface element 702 having abbreviated content is caused to appear based on the user selecting one portion (e.g., control 701) of the user interface. Furthermore, when the user selects another portion of the user interface (e.g., the gallery control 801 or the control 703 of FIG. 7), the fuller gallery user interface element 200 is caused to appear as user interface stacked to the right in the extendible direction of the canvas. The position of the user interface element interacted with to trigger opening of the gallery is one example of context-driven opening of the gallery in which the trigger location results in different versions of gallery user interface elements that express the gallery content.

Another example, a state of a current workflow in which the gallery is triggered is another user interface context in which a different version of the gallery user interface element might express the gallery in a different manner. For instance, suppose that there is a particular state of a workflow in which less than all of the selectable service controls are needed. In that case, the version of the gallery user interface element opened might exclude those selectable service user interface elements that are not needed given the particular state of the workflow.

Figure 9:
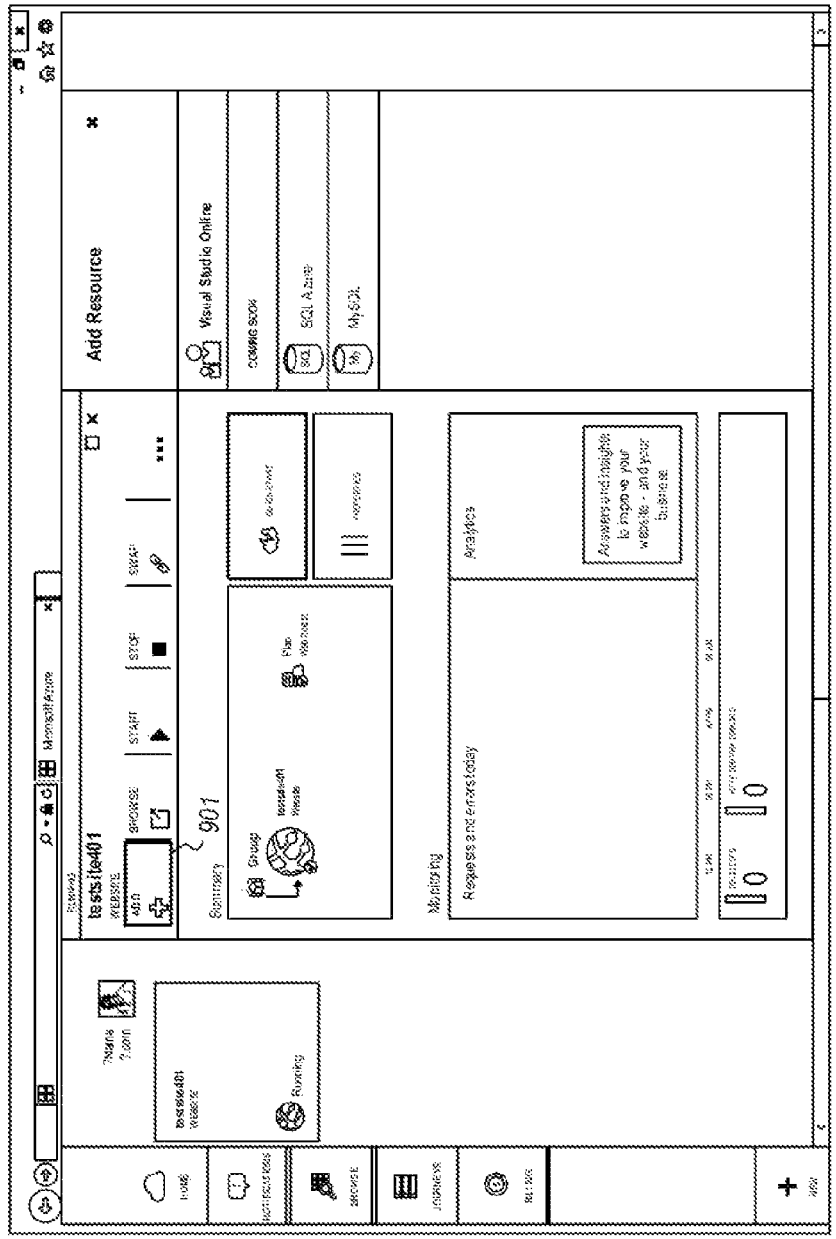
FIG. 9 illustrates a user interface in which the user opens the gallery by selecting a gallery control within a configuration user interface element, such as a web site.

FIG. 9 illustrates a user interface 900 in which the user opens the gallery by selecting a gallery control 901 within a web site configuration user interface element 902. In response a significantly abbreviated gallery user interface element 903 is caused to appear offering resources that have a strong affinity to the web site.

Figure 10:
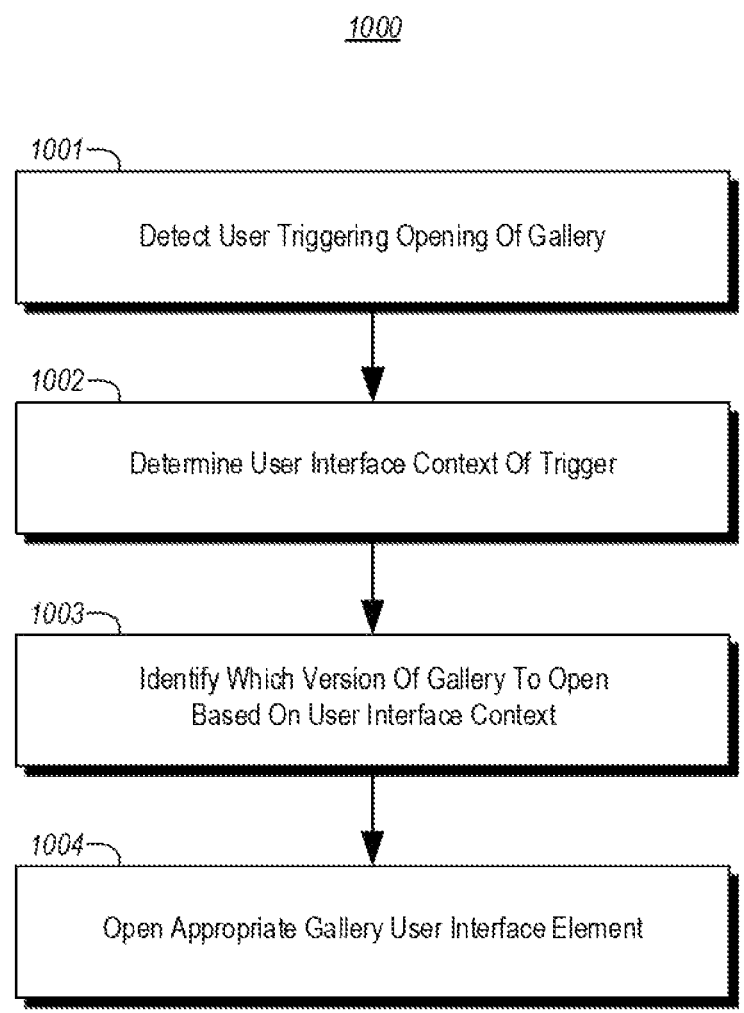
FIG. 10 illustrates a flowchart of a method for accessing a gallery user interface element representing a version of a gallery that depends on context.

Thus, FIGS. 7 through 9 illustrate user interfaces in which the manifestation of the gallery is context-specific. FIG. 10 illustrates a flowchart of a method 1000 for accessing a gallery user interface element representing a version of a gallery, and will be described with frequent reference to the examples of FIGS. 7 through 9.

The user first detects (act 1001) user input that triggers opening of the gallery. For instance, the user may trigger the control 701 or 703 of FIG. 7, the control 801 of FIG. 8, or the control 901 of FIG. 9. The system then determines (1002) a user interface context of the user input. The system is implicitly aware of its current context, and the context in which the input is triggered.

The system then identifies (1003) which of a plurality of versions of the gallery to open based on the user interface context, and then displays (act 1004) the gallery user interface element that has the identified version of the gallery.

For instance, in the case of the user selecting control 701, the gallery user interface element 702 is displayed. In the case of the user selecting control 703 or control 801, the gallery user interface element 200 is displayed. In the case of the user selecting control 901, the gallery user interface element 903 is displayed.

Figure 11:
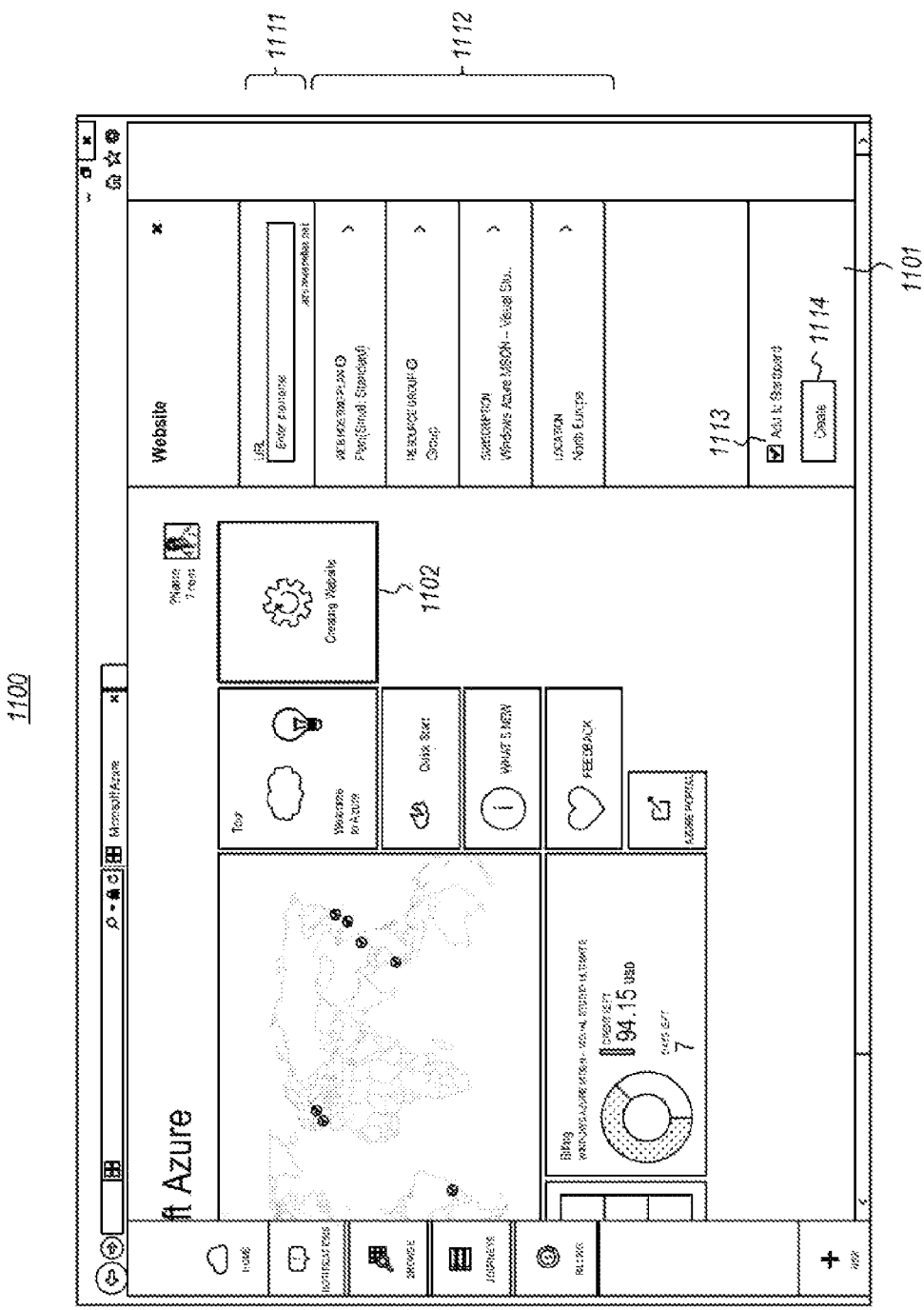
FIG. 11 illustrates a user interface in which the user engages in a workflow to create a resource.

FIG. 11 illustrates a user interface 1100 in which the user engages in a workflow to create a resource. In this example, there is again an extendable canvas in which user interface elements (which will also be called herein "blades") are added to the canvas in the extendible direction (e.g., rightward) of the canvas. A "blade" is a user interface element that spans substantially all of the extent of the canvas in the direction perpendicular (e.g., vertically) to the extendible dimension (e.g., horizontal) of the canvas, within a certain extent of the canvas in the extendible dimension.

In this example, the user has initiated creation of a web site, causing a web site blade 1101 to appear. This provides the user with a certain user experience that has common behaviors regardless of which service control was selected. For instance, in this case, a blade includes a selector which may be created from a common selector template used for all blades from which a selection is to be made. For instance, the selector template may be used to generate portion 1112 of the blade. This blade also includes a form portion 1111 which may be created from a common form template that is data driven. The blade 1110 also includes a common "add to startboard" control" 1113, which gives the user the option to add a provisioning user interface element 1102 to the user interface representing that the selected service is in the process of being provisioned. The blade 1110 includes a create control 1114, which initiates the create process.

The position and appearance of the elements 1111, 1112, 1113 and 1114 may be similar regardless of which service is being provisioned. Furthermore, the option to display a provisioning user interface element 1102 may have similar behavior, with the provisioning user interface element having consistencies (e.g., same size, pinned to a consistent place, and morphing into the completed resource user interface element when complete). Furthermore, once the work of a blade is complete, the blade may disappear from the right of the journey of blades in a manner that is consistent across user experiences, regardless of the service control originally selected to initiate the user experience.

Furthermore, the button 1114 may be visible across all user interface elements, but may be an "OK" or "Confirm" button where nothing is being created as a result of its selection. Each of the fields in the blade 1110 (such as the field in the forms portion 1111) may have associated validations. If, for example, the data input is not valid, the form 1111 may show some visualization representing that. For instance, the field and/or its contents may turn red, and/or the button 1114 may be disabled. Furthermore, there can be dirty value detection. For instance, a dirty value occurs when the value has changed since the time the value was last updated in the form either via user input or as a consequence of other one or more fields being changed. A visualization might also represent that the value in a field is dirty. For instance, the field and/its content may be made purple.

Figure 12:
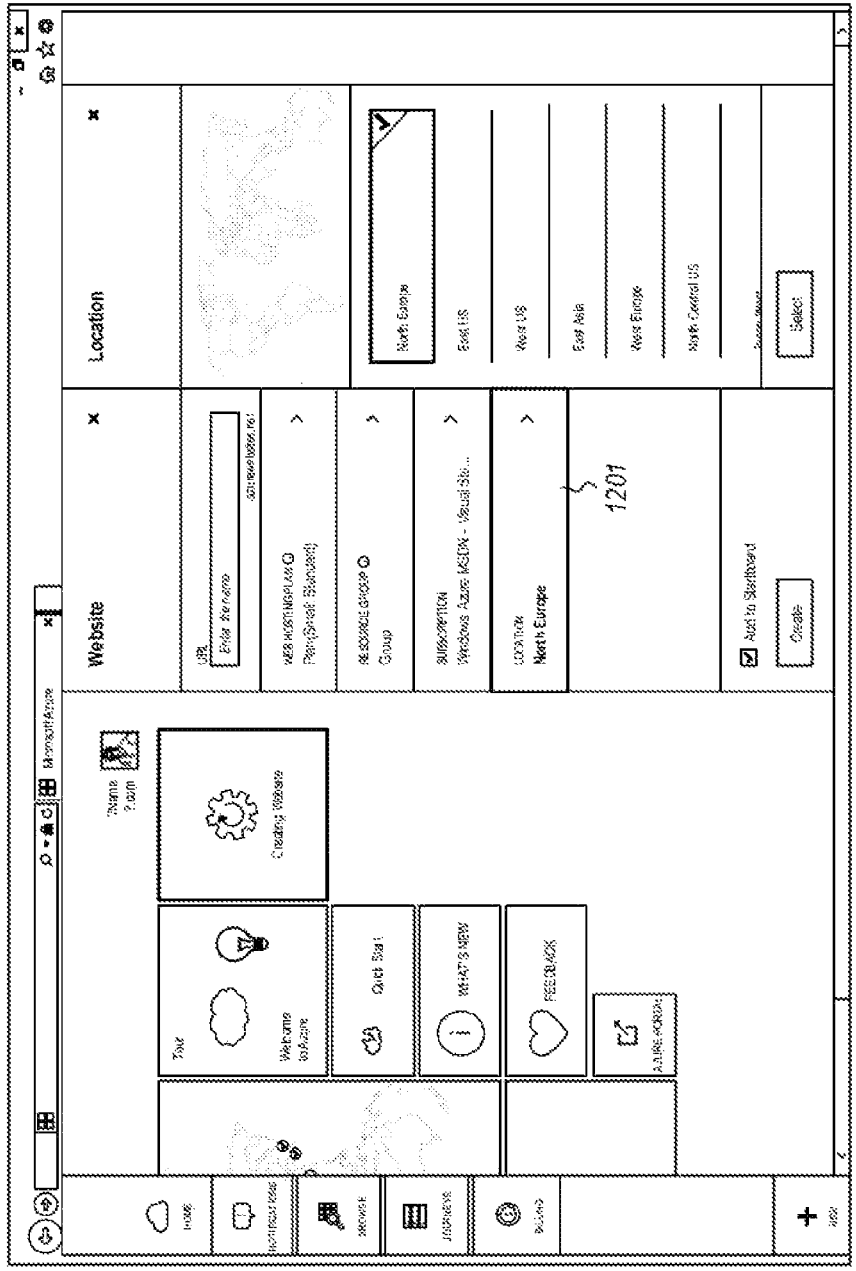
FIG. 12 illustrates a user interface that is similar to the user interface of FIG. 11, except that the user has selected a field in a first selector blade, thereby causing another selector blade to open.

FIG. 12 illustrates a user interface 1200 that is similar to the user interface 1100 of FIG. 11, except that the user has selected the field 1201 to provide input for that field, thereby causing another selector blade 1202 to open. Here, the user has selected "North America" from the selector blade 1202. Again, the selector blade may have been constructed from a selector template, with only data and a pointer being provided. Note that the selector blade 1202 looks consistent with the selector blade 1101 in a number of respects. The height and width are the same. They both contain a name field at the top with a blackened background. The text describing the selection options are all left justified with the same font and size. The selections are each separated by a similar horizontal line. All of the selector blades have a control button in the lower left corner. Thus, consistency is preserved across user experiences regardless of the service control that initiated the user experience.

Figure 13:
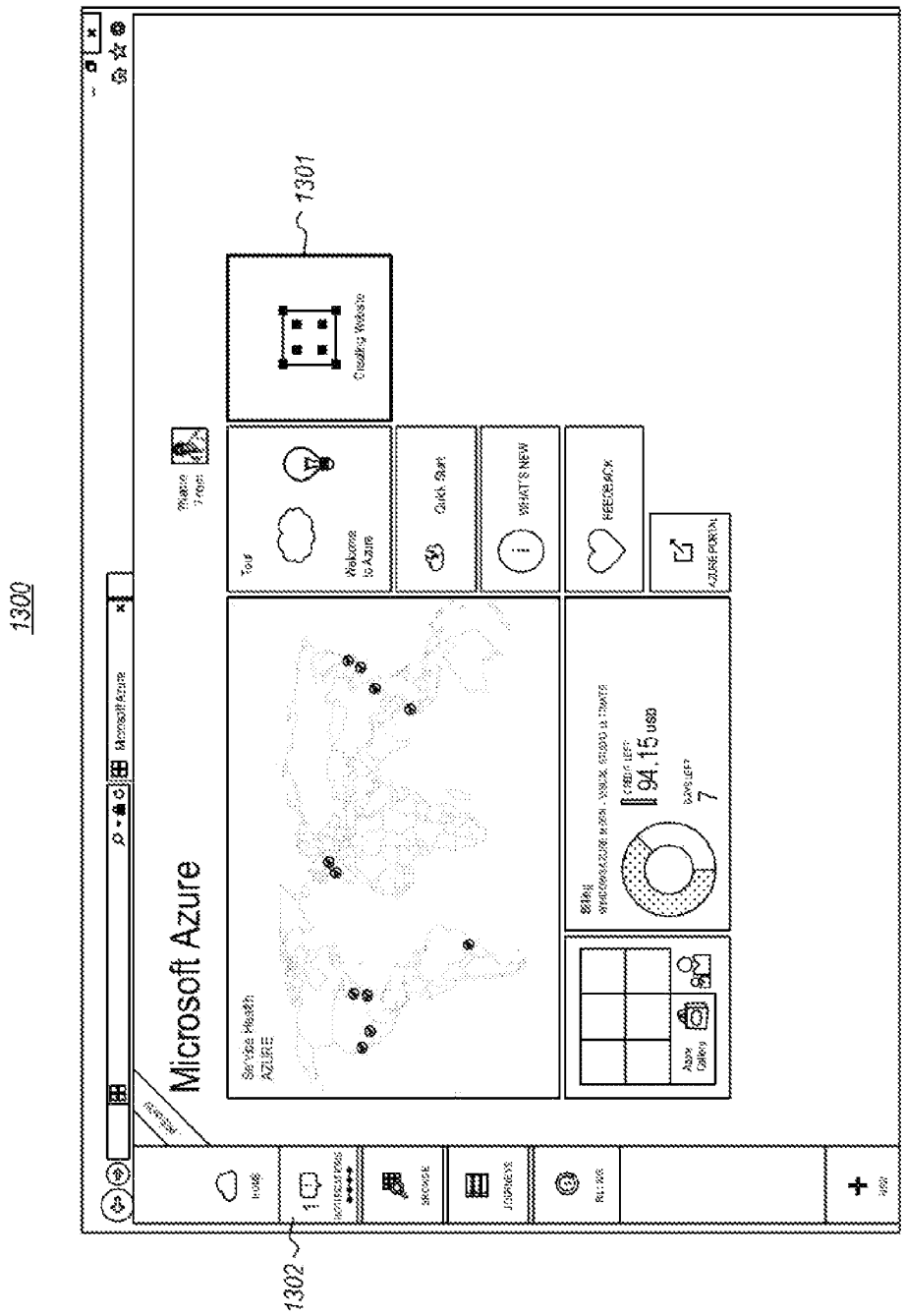
FIG. 13 illustrate a user interface in which there is a provisioning part that represents a website creation process.

FIG. 13 illustrate a user interface 1300 in which there is a provisioning part 1301 that represents a website creation process. A notifications field 1302 of an activity pane (spanning vertically along the left side of the user interface 1300) also shows that there is a notification, which is associated with the creation. The user may select the notifications field to obtain the user interface 1400 of FIG. 14.

Figure 14:
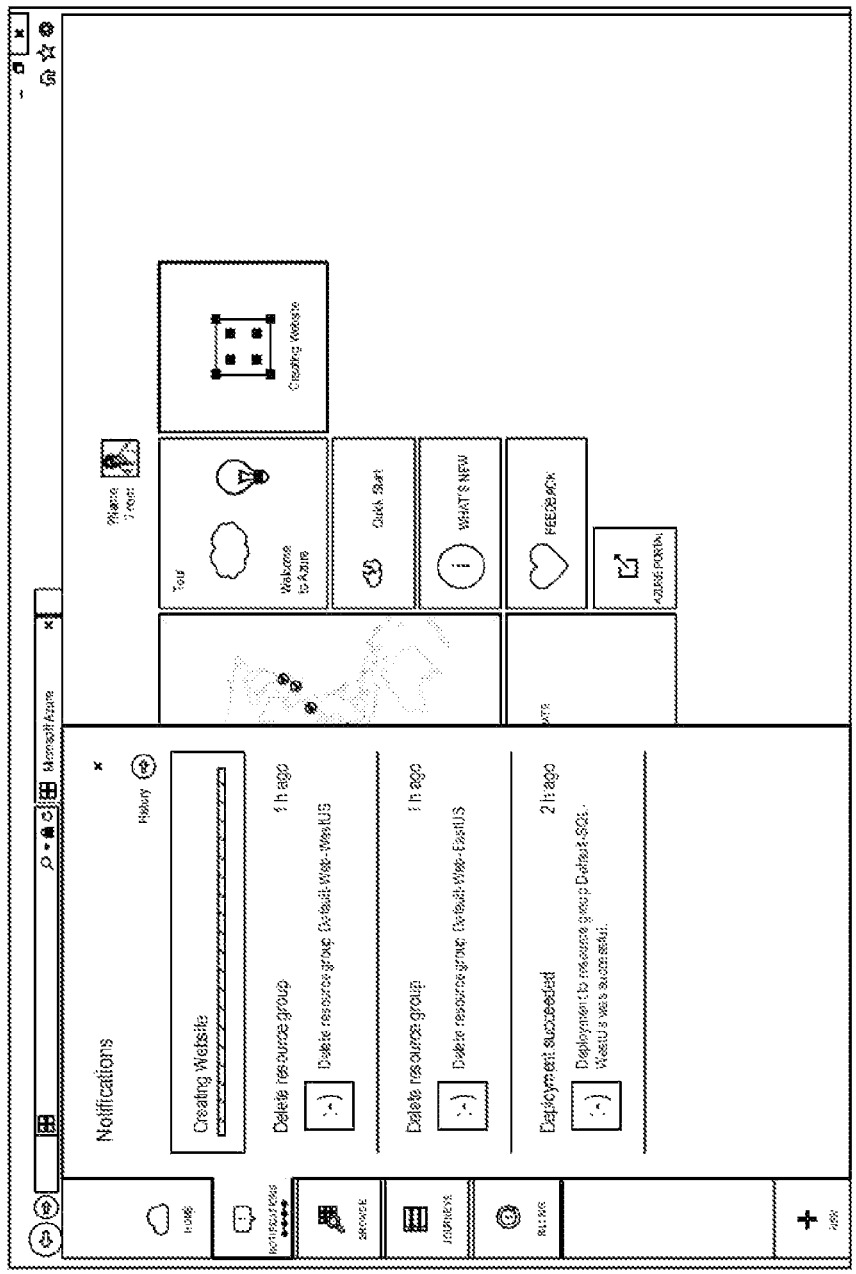
FIG. 14 illustrates a user interface that is similar to the user interface of FIG. 13, except that a notification details window has appeared, giving the user a status of the website creation process.

FIG. 14 illustrates a user interface 1400 that is similar to the user interface 1300 of FIG. 13, except that a notification details window 1401 has appeared, giving the user a status of the website creation process.

Accordingly, the principles described herein provide a robust and context-specific gallery user interface element that allows for a consistent user experience regardless of which entity provided the service control or underlying logic that is initiated from within the gallery.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method performed by one or more processors of a computing system which includes a memory containing computer-executable instructions which cause the one or more processors to perform the computer-implemented method, and wherein the computer-implemented method is used to control display of a plurality of selectable service elements on an extendible canvas of an interface display, the computer-implemented method comprising:

initiating at an interface display an extendible canvas which can be scrolled to display one or more selected portions of the extendible canvas at the interface display;

initiating a category presentation segment in a first area of the extendible canvas containing a plurality of selectable service user interface elements that are collectively offered by a variety of different applications, application extensions, or a computing system's operating system, wherein the selectable service user interface elements are operable for selection without requiring a user to leave the extendible canvas for an environment different than that of the extendible canvas, at least one of the plurality of selectable service user interface elements presented by the category presentation segment contains a trigger location for a user input that is context-specific, so that when activated, a different version of a selected service user interface element is opened, the different version being context-specific, wherein the user input that is context-specific is within a particular state of a workflow in which less than all of the multiple service controls of a selected service user interface element are needed, the different version that is opened excluding those service controls that are not needed given the particular state of the workflow, and wherein each of the plurality of selectable service user interface elements corresponds to a predetermined action that is performed in response to selection of the corresponding service user interface element; and initiating a selected category presentation segment that presents multiple service controls of a selected service user interface element in a second area of the display portion of the extendible canvas.

2. The computer-implemented method in accordance with claim 1, wherein each of the selectable service user interface elements are presented, when selected, in the second area of the extendible canvas in a manner that provides a consistent appearance including size, icon placement, and name position.

3. The computer-implemented method in accordance with claim 1, wherein the method further comprises:

selecting one of the multiple service controls of a selected service user interface element in the second area of the display portion of the extendible canvas; and initiating a service description segment for the selected multiple service control, the service description segment describing the service provided by the selected multiple service control; and the service description segment being presented in a third area of the display portion of the extendible canvas.

4. The computer-implemented method in accordance with claim 3, wherein the service description segment is provided with a control that permits the service description segment to be selectively pinned or unpinned to the third area of the display portion of the extendible canvas.

5. The computer-implemented method in accordance with claim 1, wherein the multiple service controls of a selected service user interface element that are presented in the second area of the display portion of the extendible canvas are assigned different priorities, and wherein a multiple service control having a high priority is presented in a large format as compared to other multiple service controls of the selected service user interface element presented in the second area of the display portion of the extendible canvas.

6. The computer-implemented method in accordance with claim 1, wherein each of the plurality of service user interface elements have a consistent appearance as to at least size, icon placement, and name position.

7. The computer-implemented method in accordance with claim 1, wherein at least one of the plurality of service user interface element, when selected from the category presentation segment, includes display of a provisioning process for the selected service user interface element.

8. A computer-program product comprised of a computer-readable medium containing computer-executable instructions which, when executed, cause one or more processors of a computing system to perform a computer-implemented method, wherein the computer-implemented method is used to control display of a plurality of selectable service elements on an extendible canvas of an interface display, and wherein the computer-implemented method comprises:

initiating at an interface display an extendible canvas which can be scrolled to display one or more selected portions of the extendible canvas at the interface display;

initiating a category presentation segment in a first area of the extendible canvas containing a plurality of selectable service user interface elements that are collectively offered by a variety of different applications, application extensions, or a computing system's operating system, wherein:

the selectable service user interface elements are operable for selection without requiring a user to leave the extendible canvas for an environment different than that of the extendible canvas, at least one of the plurality of selectable service user interface elements presented by the category presentation segment contains a trigger location for a user input that is context-specific, so that when activated, a different version of a selected service user interface element is opened, the different version being context-specific, wherein the user input that is context-specific is within a particular state of a workflow in which less than all of the multiple service controls of a selected service user interface element are needed, the different version that is opened excluding those service controls that are not needed given the particular state of the workflow, and wherein each of the plurality of selectable service user interface elements corresponds to a predetermined action that is performed in response to selection of the corresponding service user interface element;

initiating a selected category presentation segment that presents multiple service controls of a selected service user interface element in a second area of the display portion of the extendible canvas; and wherein the category presentation segment and the selected category presentation segment are provided with a control that permits the category presentation segment and the selected category presentation segment to be selectively pinned or unpinned to the first area and second area, respectively, of the display portion of the extendible canvas.

9. The computer-program product in accordance with claim 8, wherein each of the selectable service user interface elements are presented, when selected, in the second area of the extendible canvas in a manner that provides a consistent appearance including size, icon placement, and name position.

10. The computer-program product in accordance with claim 8, wherein the method further comprises:

selecting one of the multiple service controls of a selected service user interface element in the second area of the display portion of the extendible canvas; and initiating a service description segment for the selected multiple service control, the service description segment describing the service provided by the selected multiple service control; and the service description segment being presented in a third area of the display portion of the extendible canvas.

11. The computer-program product in accordance with claim 10, wherein the service description segment is provided with a control that permits the service description segment to be selectively pinned or unpinned to the third area of the display portion of the extendible canvas.

12. The computer-program product in accordance with claim 8, wherein the multiple service controls of a selected service user interface element that are presented in the second area of the display portion of the extendible canvas are assigned different priorities, and wherein a multiple service control having a high priority is presented in a large format as compared to other multiple service controls of the selected service user interface element presented in the second area of the display portion of the extendible canvas.

13. The computer-program product in accordance with claim 8, wherein each of the plurality of service user interface elements have a consistent appearance as to at least size, icon placement, and name position.

14. The computer-program product in accordance with claim 8, wherein at least one of the plurality of service user interface elements, when selected from the category presentation segment, includes display of a provisioning process for the selected service user interface element.

15. A computing system comprising:
one or more processors;
a display;
a memory containing computer-executable instructions which cause the one or more processors to perform a computer-implemented method used to control display of a plurality of selectable service elements on an extendible canvas of an interface display, the computer-implemented method comprising:
initiating at an interface display an extendible canvas which can be scrolled to display one or more selected portions of the extendible canvas at the interface display; initiating a category presentation segment in a first area of the extendible canvas containing a plurality of selectable service user interface elements that are collectively offered by a variety of different applications, application extensions, or a computing system's operating system, wherein:
at least one of the plurality of selectable service user interface elements presented by the category presentation segment contains a trigger location for a user input that is context-specific, so that when activated, a different version of a selected service user interface element is opened, the different version being context-specific,
wherein the user input that is context-specific is within a particular state of a workflow in which less than all of the multiple service controls of a selected service user interface element are needed, the different version that is opened excluding those service controls that are not needed given the particular state of the workflow, and
wherein each of the plurality of selectable service user interface elements corresponds to a predetermined action that is performed in response to selection of the corresponding service user interface element; and
initiating a selected category presentation segment that presents multiple service controls of a selected service user interface element in a second area of the display portion of the extendible canvas.

16. The computer system in accordance with claim 15, wherein
and the selected category presentation segment is provided with a control that permits the selected category presentation segment to be selectively pinned or unpinned to the second area of the display portion of the extendible canvas; and
wherein the one or more processors implement the computer-implemented method by:
selecting one of the multiple service controls of a selected service user interface element in the second area of the display portion of the extendible canvas; and
initiating a service description segment for the selected multiple service control, the service description segment describing the service provided by the selected multiple service control; and
the service description segment being presented in a third area of the display portion of the extendible canvas.

17. The computer system in accordance with claim 15, wherein the computer-implemented method further comprises:
selecting one of the multiple service controls of a selected service user interface element in the second area of the display portion of the extendible canvas; and
initiating a service description segment for the selected multiple service control, the service description segment describing the service provided by the selected multiple service control; and
the service description segment being presented in a third area of the display portion of the extendible canvas.

18. The computer system in accordance with claim 17, wherein the service description segment is provided with a control that permits the service description segment to be selectively pinned or unpinned to the third area of the display portion of the extendible canvas.

* * * * *